Aug. 19, 1952 P. EISLER 2,607,825
ELECTRIC CAPACITOR AND METHOD OF MAKING IT
Filed Oct. 17, 1949 2 SHEETS—SHEET 1

Inventor
Paul Eisler
By: Emery, Holcombe & Blair
Attorneys

Aug. 19, 1952     P. EISLER     2,607,825
ELECTRIC CAPACITOR AND METHOD OF MAKING IT
Filed Oct. 17, 1949     2 SHEETS—SHEET 2

*Inventor*

Paul Eisler
By Emery, Holcombe & Blair
*Attorneys*

Patented Aug. 19, 1952

2,607,825

UNITED STATES PATENT OFFICE 2,607,825

ELECTRIC CAPACITOR AND METHOD OF MAKING IT

Paul Eisler, London, England

Application October 17, 1949, Serial No. 121,739
In Great Britain October 20, 1948

27 Claims. (Cl. 175—41)

This invention relates to electric capacitors and printed circuits containing capacitors, which consist of superimposed conducting layers or sheets separated from each other by relatively thin layers of insulation.

In known capacitors which consist of conducting layers separated by insulation, two strips of metal foil and four or more wider strips of paper are superimposed and then rolled together into a small rolled block, using leading-in strips of foil to form the terminals. The block is then sealed. Aluminum foil is generally favoured, and it is not usual to provide soldered or similar connections between the leading-in strips and the main sheets of foil. A minimum of two layers of condenser tissue paper is used between adjacent sheets of foil to guard against the possibility of breakdown through pin holes in the paper, although a single layer of paper would ordinarily be sufficient to satisfy voltage requirements. The paper is made considerably wider than the foil sheets to ensure the separation of the sheets at the edges and to prevent creep.

It is one object of the present invention to provide an improved method of making insulated conducting sheet material for fabricating electric capacitors and printed circuits containing capacitors.

A further object is to provide a method of making capacitors of which the dielectric has a desirably high permittivity.

In certain of its forms the invention enables insulated conducting material to be produced in the form of thin flexible sheets or strips which are marketable as rolls from which a required length or area can be cut, to form a single capacitor of given value. It also enables a made-up capacitor to be trimmed in order to adjust its value to a desired figure simply by cutting off a suitable portion of the insulated conducting material.

According to one aspect of the invention a method of making insulated conducting sheet material for fabricating electric capacitors and printed circuits containing capacitors comprises applying a thin coating of a liquified adherent insulating material to at least one side of a sheet of metal foil, and then causing or allowing the coating to solidify or harden. Preferably the insulating material is one which is reasonably flexible when solidified.

In another form of the invention there is applied to both sides of a sheet of metal foil a thin coating of a liquified adherent insulating material, the coating is solidified, and the coated foil is treated in an etching bath until exposed areas of metal and portions of initially unexposed metal adjacent to said exposed areas are eaten away, the said insulating material being such that it is not effected by the etching bath. To make a capacitor two or more of the coated sheets may be superimposed.

In this way the danger of breakdowns due to pin holes in the insulation is reduced, as are the dangers of accidental contact and of creep at the edges of the resulting material, since the metal is removed and deeply undercut at all places where it would otherwise be exposed.

According to another aspect of the invention a method of making insulated sheet material suitable for fabricating capacitors and printed circuits containing capacitors comprises applying to a sheet of metal foil a thin coating consisting of an adherent insulating matrix in which are embedded particles of a material of high permittivity, the thickness of the coating being approximately equal to at least one dimension of an average particle. Alternatively, where the coating is thicker than the thickness of the particles, the particles may be disposed in contact with each other and with the capacitor electrodes, or almost so, whereby field lines can extend from one electrode to the other almost entirely through the high permittivity material.

Capacitors made in accordance with the invention are suitable for use in printed circuits, but are not confined to such use. In certain instances the foil which forms part of a printed circuit may itself constitute the foil backing of the present invention, to which the insulating coating is applied.

Insulated conducting sheet material embodying the invention may be made very thin and flexible so that it can be folded in any desired manner. The term "folded" is intended to include the formation of multiple layers, either by doubling over or by rolling.

The invention also embraces the products produced in accordance with the aforementioned methods of manufacture.

Various ways in which the invention may be carried into practice will now be described by way of example with reference to the accompanying diagrammatic drawings, in which.

In making insulated conducting sheet material for fabricating electric capacitors or printed circuits containing capacitors, according to the invention, a sheet or strip of thin metal foil is taken. This foil can be the thinnest obtainable, since it is unnecessary to avoid pin holes in the foil itself.

Where the thin metal foil is aluminium it is possible, but not essential, to anodise this foil prior to the coating process referred to below. The anodising provides an additional insulating coating. While it is possible to use a variety of anodising methods for this purpose it is preferred to create the oxide layer by one of the alkali processes such as the M. B. V. (Modified Bauer-Vogel) treatment or the Pylumin process (as described in British Patent No. 441,088) with one important distinction. As the foil is very thin the oxide layer must be controlled in thickness so that a core of metallic aluminium still remains. Consequently the treatment in a bath is not suitable as it would be difficult to prevent large areas of the foil being anodised right through, while other areas would receive only a superficial oxide layer. Thus in the present invention the oxide layer is created fairly evenly and controlled to a required thickness by mixing the chemicals required to the consistency of an ink suitable for roller coating, and applying them to the foil evenly in the thickness necessary to give a layer of the required depth without risk of oxidising the whole foil through over any substantial area. Using the M. B. V. treatment the ink is made up of sodium or potassium chromate, anhydrous sodium carbonate, caustic acid, glycerine and water. The roller application puts it on in a very thin film, which is non-drying owing to the glycerine content. After several minutes, allowing for the action of the coating, the foil is rinsed thoroughly in water, or preferably in a boiling weak solution of potassium dichromate.

Figure 1:
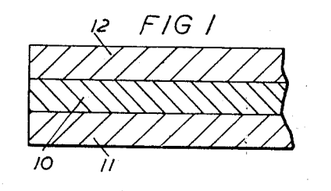
Figure 1 is a transverse section through one edge of a coated sheet of foil prior to the etching treatment.

As shown in Figure 1 the metal foil 10 is then coated on both sides with coatings 11 and 12 of an adherent insulating material which, when dry or solidified, is extremely thin, of good dielectric quality, and a resist against the acids or other chemicals used in the etching step which will be described below.

Preferably a continuous web of metal foil is used, and the coating is applied in a continuous process, preferably by roller coating or by printing. Other convenient methods which may be used are, applying the coating directly to the foil from an elongated capillary tube, or applying it by roller offsetting from an elongated capillary tube.

Where the coatings are printed on the foil this is preferably done in a printing machine having a heat-drying attachment. The coating may be printed on in strips of a width approximately equal to the length of the rolled block capacitors to be produced, with narrow blank spacings between the strips.

If the coating is not applied in strips separated by blank spacings, but is put on as a continuous covering, the coated foil is sliced into strips by suitable cutters before the etching treatment is carried out.

The coating material is applied in liquified form, for instance molten, or in solution. After application it is solidified either by cooling or by removal of the solvent. Resins such as silicone resins may also be used as the coating material, and these may be applied in liquid form and solidified by curing. Another form of coating which may be used is a thin flexible glass film, such as that known as Corning Code 8871. This must be cast on in molten, or at least plastic, condition.

Other coating materials can be based on polythene or on a polystyrene resin or some other suitable compound having a high insulating value and which is flexible and stable, within limits. Alternatively, a flexible organic or inorganic or silicone-organic enamel-like mixture may be used. In order to improve its dielectric constant or permittivity the coating may have certain high permittivity inclusions, which will be referred to in greater detail below.

In the etching treatment the coated foil is guided over a roller arrangement through an etch bath. This may be an acid or an electrolytic etch or even an anodising bath, but the simplest treatment is a smooth chemical etching. For copper or aluminium foil the recommended etch is an iron perchloride solution. For electrolytic etching a relatively high voltage should be used.

Figure 2:
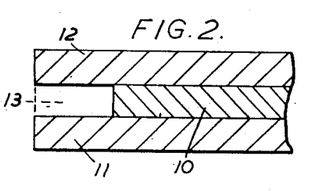
Figure 2 is a view similar to Figure 1 after the etching treatment.
Figure 3:
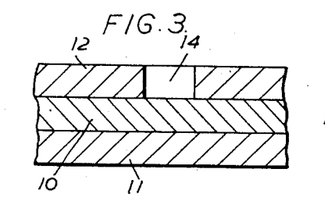
Figure 3 is a transverse section through a fragment of a coated sheet of foil in the vicinity of a pin-hole in the coating, prior to the etching treatment.
Figure 4:
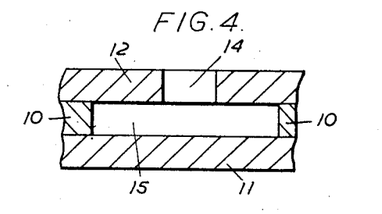
Figure 4 is a view similar to Figure 3 after the etching treatment.

The function of the etch bath is to remove metal wherever the coating has left the metal bare, and undercut the metal deeply in order to remove it not only from the edges of the strips but also from the circumference of any holes or pin holes in the coating. Figure 2 shows the edge of a sheet after etching, in which it will be seen that while the coatings 11 and 12 are unchanged the edge of the metal foil 10 has been eaten away at 13 so that it does not now extend to the limits of the coating. Similarly in the case of a pin hole 14, as shown in Figures 3 and 4, the metal is eaten away from below the circumference of the pin hole to leave a disc-like cavity 15 beneath the pin hole.

Exposed edges and pin holes have so far been one of the greatest problems in capacitor making. Pin holes could not be easily detected and so two or more coats of insulation were necessary in order to ensure that any pin holes were effectively covered up. Thus they led either to too thick an insulator and greatly increased the dimensions of the whole capacitor, or to the use of separate dielectrics such as paper. Even then pin holes constituted a weak spot at which a breakdown was more likely than anywhere else.

In addition to dealing with the edges and pin holes, the etch treatment also divides the foil into strips, if the coating is printed or otherwise applied in strips.

After the etch treatment, which is prolonged sufficiently to make sure that the metal under and near to all bare strips and points is completely removed, the foil is passed through washing and drying stations, after which it can be rolled for marketing as the raw material for fabricating rolled block capacitors or other electric circuit components.

In an alternative arrangement the strips, after etching, are passed through a second printing or coating process which applies a second coating of insulating material. This second coating may be a wax made flexible by combining it with rubber or a resin or enamel compatible with the first coating. This second coating, too, may contain high permittivity inclusions. The second coating is preferably put on by heated rollers, or the strip may be taken over heated rollers after the coating stage to achieve a very thin layer and to squeeze the coating into any holes and over the edges of the strip.

Two strips, either both with a single or double coat, or one with a single and one with a double coat, can be superimposed and rolled together, and either by heating or by the tack of the coating sealed together into a single band. In order to separate the edges of the strips they are staggered along their width, so that the edge of one strip overhangs at each side. The capacity is reduced by the amount of the overhang, but as the insulation is reliable the creep path from edge to edge is large, and the arrangement simplifies connections to the foil at opposite ends of the rolled block, either before or after the rolling stage. By removing some of the insulating coating on the overhanging portion, terminals may be secured by soldering or otherwise. The ends may be sealed by solder dip or metal caps. Parts of the foil may be burst out and folded to extend over the free edge, or the ends of the foils may be folded to extend out along the axis of the roll.

Instead of rolling two coated foils it is possible to use only one foil with one coating or more of insulating covering, and replace the second foil by a conductive coating of the insulated foil on both sides, or preferably only on one side, keeping the edges of the foil free of this conductive coat.

Figure 5:
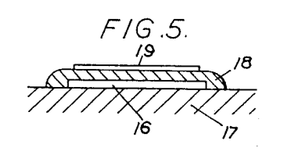
Figure 5 is a cross-section through one form of material during manufacture.
Figure 6:
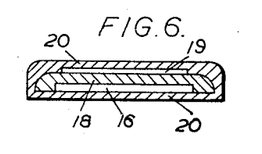
Figure 6 is a cross-section through the same material when completed.

One example of this is shown in Figures 5 and 6. A strip of metal foil 16 about one three-thousandth of an inch thick is placed on a heated steel band 17 and a layer of melted polythene 18 about half a thousandth to one thousandth of an inch thick is extruded over the foil, overlapping its edges. When the polythene has been at least partially solidified by cooling an extremely thin layer 19 of metal, preferably aluminium, is deposited thereon, for instance by vacuum deposition. Aluminium is preferred on account of its self-healing properties. The whole is then finally enclosed in a polystyrene envelope 20 about half a thousandth of an inch thick, as shown in Figure 6. The resultant band is very thin and flexible and can readily be rolled up into a rolled block capacitor. If desired an etching process can be carried out to rectify pin hole defects. Owing to the ease with which it can be stretched, polythene itself would be unsuitable as a support for an extremely thin film of vacuum deposited metal, but in this case, the strip of foil 16 prevents the polythene from stretching.

In other cases the conductive coating can be made of graphite or of metal applied in any suitable way, for instance by electroplating, spraying or powder printing. Whatever process of application is used it is desirable that the conductive coating should be thin, reasonably uniform and not too brittle. If the insulating coating of the foil, and the foil itself, can stand the process, even a friction calendering of tin sud may be used to put on the conductive coating. A transfer method may also be used, for example by forming electrolytically a thin adherent metallic foil on a flexible metal strip or on a metal roller and transferring the deposited metal foil to the insulated foil by hot rolling it on in a continuous process.

Figure 7:
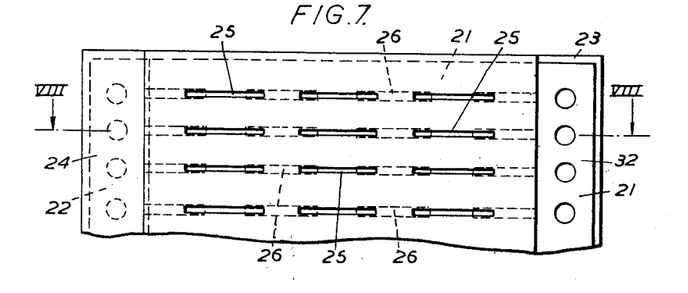
Figure 7 is a plan of part of a capacitor comprising two coated sheets bonded together. The figure illustrates the arrangement of parallel lines of severance.
Figure 8:
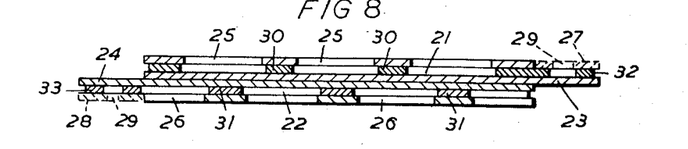
Figure 8 is a transverse section taken on the line VIII—VIII in Figure 7.

In certain instances multi-layer sheet material may be so arranged that lengths or areas of a required size can be cut off to form single components of given value. It will be appreciated that in the ordinary way the thin multi-layer sheet material cannot safely be cut, since the edges of the foil sheets at the cut surface will only be separated by the thickness of the insulating coating between them, and may even burr over into contact. In the arrangement now to be described the material is provided with lines of severance along which it can safely be cut. One arrangement of this sort is shown in Figures 7 and 8.

In this arrangement two sheets of foil 21 and 22 are covered on both sides with printed coatings of insulating material. On one side the coatings 23 and 24 extend over the whole surface of the foil, while on the other side the coating is printed so that the foil is left bare in several parallel series of strips 25 and 26. As shown in Figure 7, all the strips of a series are aligned with one another to form a line of severance, and are separated by distances which are shorter than the lengths of the strips. Each sheet of foil is provided with an exposed margin on one side which is subsequently coated with a temporary covering which need not be a good dielectric, but must be a good etch resist and must be easily soluble in a solvent which has no influence on the main coating material. These temporary coverings are shown at 27 and 28, and are each provided with a series of holes 29 arranged in alignment with extremities of lines of severance.

Each coated sheet is now subjected to an etching bath which not only eats away the metal at the edges of the coated sheet but also the metal beneath the bare strips 25 and 26 and the holes 29. As a result there will be left short bridges of metal 30 and 31 in the lines of severance between the ends of the exposed areas 25 and 26 respectively, these bridges being shorter than the gaps between them. The coated sheets are now secured together with the complete coating layers 23 and 24 back to back, and with the marginal portions coated with the temporary coverings overhanging. Care is taken in securing the two sheets together that the strips 25 of one sheet are accurately aligned and staggered in respect of the strips 26 of the other sheet, as best shown in Figure 7. The temporary coverings 27 and 28 may be removed by suitable solvents at any stage in the process after etching in order to expose bare margins of metal 32 and 33, to constitute terminal connections. The holes etched in the bare margins beneath the holes 29 in the temporary covering serve to indicate the termination of the lines of severance, and the holes 29 may if desired act as registers when superimposing the sheets.

If now it is desired to cut off a portion of the resultant sheet material to form a capacitor of given value, it is merely necessary to cut off the required length along the appropriate line of severance. As will be seen in Figure 8 the portions of metal 30 and 31 along the edges of the cut are spaced from one another and do not overlap, so that the creep path between them will be fairly long, and they cannot be burred over during cutting.

An alternative way of forming the lines of severance would be to coat both sides of the foil sheets completely and then subsequently remove the metal strips mechanically.

If a second coating of insulating material is required, it can be applied to the sheets after the etching process, either on one or both sides. Apart from considerations governing the specification of dielectrics, generally the second coating may be so specified as to provide for good and convenient bonding and sealing of the two sheets, to make up the multi-layer capacitor stock.

The multi-layer material just described is a material which may be marketed as a ready-made capacitor material like a tape, which may be applied by a tape dispensing device or a labeller. The material can be used to make wound capacitors of fairly large values, but it is also applicable to smaller flat capacitors which are not wound. Such small capacitors are suitable for insertion in printed circuits and can be fixed to a supporting surface in a very convenient and economical way. Where the material is to be used only for flat capacitors the flexibility of the coatings is less important than their stability, sealing properties, good dielectric properties, and corrosion protection.

Where the foil is to be coated all over on one side, this may be done best by roller coating, but a film-like coating is printed on sides where bare foil areas are to be left. The printed film may be so thin that it could not serve as a satisfactory support for the foil, but other disadvantages of a thin film such as pin holes and edge irregularities are removed by the etching process. In view of the thinness of the printed film, however, the mechanical strength may not be very great, so that it is desirable carefully to support and guide the coated strips during the etching, washing and drying stages. To give additional strength a strip of paper, for example waxed paper, may be squeezed on to the coated strip and reeled up with it. When the individual component is being wound or folded the waxed paper is stripped off as the winding or folding proceeds.

It is not essential for two separate foil lengths to be prepared in order to make capacitors of the kind described, since a single foil length may be prepared from which are cut two suitable strips which are then superimposed so that the bare foil margins are on opposite sides of the composite strip, either with the bare metal facing in the same direction, say downwards to facilitate fixing, or with the bare metal facing in opposite directions so as to bring the wholly coated sides of the strips 23 and 24 together as shown in Figure 8. The latter method may necessitate folding down the upward-facing bare margin to facilitate fixing.

It will be appreciated that in the arrangement described the length of the cut off composite strip determines the value of the individual capacitor, and as such cutting may be done only along the lines of severance there is only a predetermined set of fixed values for individual capacitors obtainable from the same composite strip. Composite strips of different widths, different staggering of the superimposed areas of the two foils, different spacing of the lines of severance, or different coating specifications will give different sets of values for the individual capacitors, and thus a wide range of capacitors can be adopted.

Figure 9:
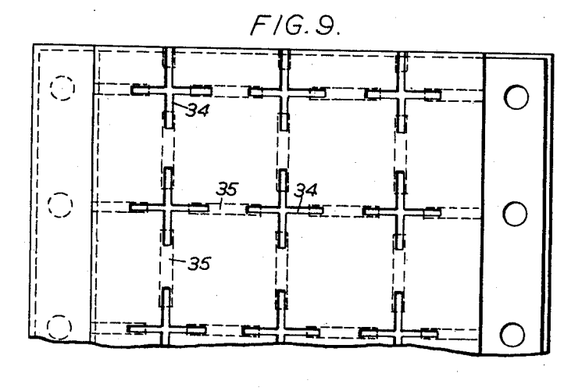
Figure 9 is a plan view similar to Figure 7, showing the arrangement of two sets of lines of severance disposed at right angles to one another.

In this variation the coating on one side of one foil sheet is printed with cross-shaped bare areas 34, while one surface of the coating of the other foil is printed with bare areas 35 arranged in squares. The bare areas 35 do not extend as far as the corners of the squares.

The two coated foil sheets are superimposed as shown in Figure 9 so as to provide lines of severance not only transverse to the length of the composite strip, but also longitudinally. This allows the composite strip not only to be cut across its width with the same safety as in the first case, but also allows it to be cut along its length so that it can be cut into a variety of shapes. In addition, one or more squares or rectangles can be punched out to make the values of single capacitors adjustable in spacings determined by the size of the square or rectangle cut out.

Where single flat capacitors are employed they may be stuck, bonded or otherwise fixed to a supporting surface, or sandwiched between two insulating plates, or sealed in with the bare foil margins extending beyond the sandwich or seal. Where the supporting surface is the panel or sheet of a printed circuit, the electrical connection can be achieved by solder-spraying or otherwise soldering the bare foil margins directly to the conductors of the printed circuit, or by fixing them through the holes in the bare foil margins by eyelets or tags, preferably soldering them as well. Since the pieces are flat they are very conveniently placed and stuck on prior to the solder spray. They can also be made self-adhesive, and in many ways dealt with as if they were labels which can be cut from the composite strip in a shape not only to provide the desired value, but also to some extent to suit the terminals and circuit layout. After the electrical connections are made, insulating covers may be fixed, or lacquer or other coatings applied, to seal the capacitor to the panel or sheet of the printed circuit.

Where space on the panel is restricted, or the layout does not permit the sticking of the flat capacitor direct to the panel, the composite strip may be folded along its length over a stiff piece of insulation so that the bare foil margins come on to opposite sides of the insulation. The connection is made by clamping or otherwise fixing the capacitor between terminals, leaving it standing perpendicular to the panel.

Where the area of the capacitor is undesirably large it may be rolled up or suitably folded, leaving the bare foil margins extending and accessible for connection purposes.

Apart from sealing the capacitor and supporting it, the bonding of it to an insulator also serves to improve its thermal stability, since if the capacitor is firmly fixed to the insulator the expansion of the metal foil with rises in temperature may be reduced. The elasticity of the thin composite sheet, its structural semi-separation into mechanically loosely connected squares or rectangles, together with the strength of the bond between the weak metal foil and the strong insulator, will give the capacitor a temperature stability influenced more by the dimensional characteristics of the insulator than those of the foil.

When coating the foil, the coating specifications for different sides of the foil may be different, for instance to give a good dielectric on one side and a good bonding coat on the other. In the case of certain inorganic coatings there must be a variation of the procedure described, necessitated by the need for curing, or preparation of the foil prior to coating, or the like. In certain cases heat curing may make the composite strips less flexible, in which case they would be marketed in flat lengths instead of in rolls.

Even when the invention is applied to patterned foils such as are used in printed circuits, the use of a very thin foil is again desirable. However, with very thin metal foil layers, it is desirable to design the pattern, if possible, so that very narrow pieces of foil are avoided. If this is done there is not too great a danger that pin holes in the foil may cause a break in the conductors. It also permits the use of a quick etch giving a reasonable undercut, without danger that the undercut will extend right across the width of the narrow portion of the foil. Also, if narrow pieces of foil are avoided, electrical connections to the foil are simplified.

The coatings referred to above are all homogeneous and of relatively low permittivity, but if it is desired to make a capacitor of high capacity and small volume it is essential that a material of high permittivity should be used.

It has hitherto been proposed to make sheets of high permittivity material, such as alkaline earth titanates, in suitable mixes by a kind of casting process, firing these sheets, and using them in similar ways as mica sheets are used (see Howarth, G. N., Breckenridge, R. G., and Brownlow, J. M., "Fabrication of Thin Ceramic Sheets for Capacitors" Journal of the American Ceramic Society, Ceramic Abstracts, volume 30, No. 8, August 1, 1947, pages 237–242).

This method does not give flexible sheets, nor sheets thin enough, nor is it cheap enough for wide scale use.

Another attempt has been made to create a high permittivity material by mixing a proportion of high permittivity ferroelectric ceramic powders, such as the titanates of barium, magnesium, or strontium, with plastics, but it was found that such a high proportion of the powders had to be added in order to improve the dielectric constant of the material appreciably that the product lost much of its attractiveness.

In one form of the present invention, coatings of high dielectric constant may be created on metal films or foils if the coatings consist of high permittivity ceramic particles embedded in an adherent insulating matrix such as a resin, the particles being so orientated or disposed within the matrix that they extend through the whole thickness of the matrix, or at least through a very high proportion of this thickness, without necessarily extending over its whole area, or over so high a proportion of this area as to render the coating too brittle for practical purposes. Ideally in such a coating a cross-section would reveal a rectangle of compact ceramic material next to one of the matrix material, two sides of each rectangle lying in the two boundary surfaces of the coating respectively, and the other two sides which divide the materials being as long as the coating is thick and running across perpendicular to the surfaces of the coating.

A capacitor having a composite dielectric of this structure can be symbolised theoretically by two capacitors connected in parallel, one with a ceramic dielectric and the other with a dielectric of matrix material. Consequently, in spite of the composite dielectric containing no higher proportion of ceramic material than the mixtures tried hitherto, it will nevertheless afford a much smaller capacitor of the same capacity, since capacitors with the composite dielectrics hitherto proposed could be symbolised theoretically by a capacitor with ceramic dielectric in series with a capacitor with a dielectric of matrix material.

It will be appreciated that this ideal structure cannot be realised fully, nor is it always desirable that it should be realised to such an extent, particularly as the voltage breakdown requirements can be met by leaving a very thin layer of high electric strength but low dielectric constant in series with the ceramic particles between the capacitor electrodes. However, this series connected layer must be as thin as possible, and in any case only a very small fraction of the total thickness of the dielectric, in order not to counteract too much the major structural advantages of the dielectric embodying this aspect of the invention.

The coating may be produced directly on an electrode, a metal foil for example, or it may be produced and also metallised while on a temporary support and completed when on the metal electrode. The preferred method is to produce the coating directly on a metal foil. In any case the problem is to include in the coating ceramic particles, or layers of contiguous ceramic particles, of a thickness equal to the total thickness of the dielectric between the electrodes, which is in the range of fractions of a thousandth of an inch up to several thousandths of an inch.

Figure 10:
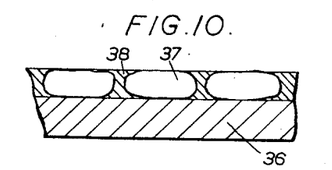
Figure 10 is a fragmentary section through a piece of coated foil provided with one form of high permittivity coating.

One method of achieving this is first to produce a flakey powder of a high permittivity ferroelectric ceramic material of a thickness equal to or very nearly equal to the desired thickness of the coating. As shown in Figure 10, a piece of metal foil 36 is coated with a layer of flakey powder, the individual flakes 37 being orientated so that they lie flat on the foil as densely as possible. The coating is so arranged that the layer of flakes is in as close a contact with the foil 36 as possible, and the gaps between the flakes are filled up by an adhesive flexible insulating material 38, for instance an elastic resin or synthetic rubber, which has good adhesion both to the ceramic particles 37 and the metal foil 36 and is a good dielectric material while of relatively low dielectric constant.

Figure 11:
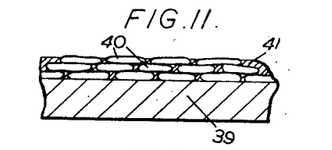
Figure 11 is a fragmentary section through another piece of coated foil showing another form of high permittivity coating.
Figure 12:
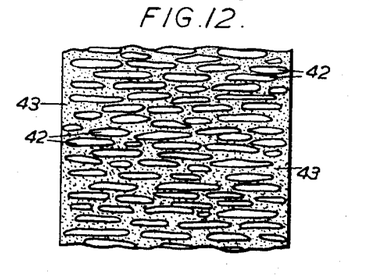
Figure 12 is a plan of a piece of coated foil showing the orientation of elongated particles of higher permittivity material in the coating.

If a fairly thick coating is required, the flakes may be applied in several layers as shown in Figure 11. Care should be taken to ensure that the flakes 40 are in contact with one another and with the metal foil 39, or almost so, so that field lines can extend from one electrode to the other almost entirely through the flakes of high permittivity material. The matrix 41 bonds the flakes together and also secures them to the metal foil 39.

Where the resultant product is to be used to make a block capacitor it is essential that it should be flexible. It is therefore desirable, as shown in Figure 12, to have relatively long and narrow flakes of ceramic material 42 embedded in a matrix 43 and to orientate these flakes so that as well as lying flat on the foil as densely as possible, they also lie with their major axes in the direction parallel with the axis about which the sheet material will eventually be rolled. The rolling can then be carried out easily and without severely disturbing the flakes.

In order to produce the flaky ceramic powders the methods used in powder metallurgy for producing flaky metal powders can be suitably adapted. Such methods are well known and it is not necessary to describe them here. Other methods are possible as well, and some will be described below, but it should be understood that the accounts given are not by any means exhaustive.

One such method consists in preparing relatively fine ceramic powders by grinding or ball milling or other usual methods and compacting these powders, either dry or wet, by mechanical pressure into a brittle film of the required thickness. The compacting pressure may be exerted by rollers, platens, stamping, etc. The brittle film crumbles into flakes. To get flakes of the desired long narrow shape, the compacting or crumbling up may be done by riffled rollers. When a wet process is used the powders may be mixed with a liquid containing a very small amount of a binder. This helps in compacting though it detracts from the high dielectric constant of the flakes.

Another method consists in producing a coating of required thickness with a mix such as that described by Howarth, Breckenridge, and Brownlow (Journal of the American Ceramic Society, Ceramic Abstracts, vol. 30, No. 8, August 1, 1947, pp. 237–242), on a support not attacked by the firing, firing to fuse the coating, and then crushing the fired coating into flakes. The original coating may be produced by more usual coating means, since its thickness is smaller than the one described in the above mentioned publication. Other variations of detail procedure may be made, but essentially up to the crushing stage the procedure described there can be adopted, and in the following a ceramic film produced in this or a similar way will be referred to as a "fused ceramic film." One important variation, however, can be made in working the present invention. As it is not necessary to obtain a coherent film by the firing it is possible to put the original coating on a support which is destroyed in the firing and which serves as a support to enable the coating to be put into the furnace, and assists in its fusing into flakes, or a flaky heap, or an easily dividable substance of flaky structure. Sheets of paper, paper coated with water glass, or other film, aluminium foil, etc., may serve as such support. The support may be coated with the mix and placed into the furnace either as single sheets, or a stack of sheets or as a roll. In case of contamination of the fused ceramic film by the destruction of this kind of support, the flakes have to be cleaned chemically. The flake shape may also be preformed by putting the coating on the support not only in the required thickness, but also in the desired shape—for instance by a stencilling device—or by combing the coating before it is dry.

Having got the flaky powder, powder compacted flakes or fused ceramic flakes, the coating of the metal foil is done in one example as follows:

The foil is coated on one side with an ink or resin of the desired properties such as power factor, electrical strength, elasticity, adhesion to the metal foil and the ceramic, viscosity at certain temperatures, etc. A coating of a drying oil, a linseed varnish, a styrene, isobutylene, or a silicone type resin or a synthetic rubber are examples. This coating will hereafter be called the oil- or resin-coating.

While the coating is wet the flakes are dusted or rolled or otherwise put on, and by brushing or doctor blades or rollers it is ensured that they lie in a single layer flat on the oil or resin coating. To assist in this, the flakes may have been wetted so that a great surface tension between the oil or resin coating and the flakes exists at the rolling-on stage. Next, the flakes are pressed down onto the foil, for instance by passing the coated foil between heavy heated rollers, thereby squeezing the oil or resin coating out from between the flakes and the foil into the gaps between the flakes. The rolling also breaks the flakes which are too large, or too large in the rolling direction, for the elasticity of the film required, and the oil or resin flows into these new gaps and breaks at the same time. In order to achieve this, the oil or resin coating must be so thin that the amount squeezed from underneath the flakes is not more than what will go into the gaps between the flakes although it actually should be less as will be seen later, and it must be or become so fluid that it will flow readily, which explains why the rollers are heated. In the case of an oil film heated rollers assist in drying of the oil, and they also guarantee the film thickness. It is usually not required nor desirable to squeeze the oil or resin film out completely from underneath the flakes, but at least sufficiently to reduce its thickness to a very small fraction of the film thickness.

The other side of the foil, hereafter called the "back," is given an oil or resin coating even thinner than the side to which the flakes are applied. In order to prepare a material for fabricating capacitors, two foils have to be superimposed, and are later on rolled or folded up or laminated into a pile and cut, etc. When superimposing one foil over the other, and also in the later processes of rolling or piling, the back of one is laid over the flake-covered side of the other and the foils are hot pressed together so that the oil or resin coating of the back, where it lies between the flakes and the upper foil, is squeezed out and completes the filling up of the gaps between the flakes, so far not completely filled by the squeezed out resin of the flake-covered side of the foil. Consequently, it is seen that the thickness of the oil or resin coating of both sides of the foil must be so dimensioned that the quantity of volume of oil or resin over the active capacitor area is just about the same as the volume of the gaps between the flakes. In practice a slightly higher volume is taken, because of the thin layer between flakes and foils which cannot be, or is not desired to be, squeezed out, and the amount of oil or resin extruding over the edges of the foil.

The coated foils may be superimposed in staggered relationship as described above in relation to Figures 7 and 8 and also etching and other processes may be used to guard against creep at the edges, pin holes, and the danger of shorts or small creep paths when cutting the sheets.

For capacitors where a more intimate contact between the ceramic flakes and the metal foil is desired the procedure is varied, for instance as follows.

A brittle fused ceramic film is produced on a support not destroyed by the firing, is silvered or otherwise metallised and fired again. The metal foil, say a tin coated copper foil, is soldered onto this film which now adheres firmly to the foil and can be stripped off the support. To make sure that no solder remains in the gaps and breaks of the brittle film, the foil is now treated in an etch bath which will attack the solder but not the copper. Boiling hydrochloric acid will serve for this purpose. The solder between the silvered ceramic film and the copper will be slightly undercut, but partly because of it being alloyed with the silver and copper, and partly because the acid has no access to it except along the gaps and break-lines of the fused ceramic film, the bond between the copper foil and the ceramic film remains intact. The gaps and breaks are now filled up with an oil or resin, which can be done during the superimposition of this foil with another by the oil or resin coat on the back of the superimposed foil, as previously described. The oil or resin film on the back of the foil must be sufficiently thick to fill all the gaps and breaks of the fused ceramic film when the two foils are squeezed together.

Another variation is to solder a brittle fused ceramic film to both foils after having filled in the gaps and breaks in it by an oil or, preferably, silicone resin, using a silvering method for the second soldering operation which requires only a relatively low consolidation temperature. A colloidal silver paint for instance, may be used for silvering the other side of the ceramic film, and a solder fusing at lower temperature than the one used for the first side. In this case there is no resin film in series with the high permittivity ceramic particles between the metal foils.

Another method is by starting off with ceramic powders not necessarily of flake shape, though this is preferred, but of any shape as long as their grain size is approximately the same as the thickness of the dielectric film. These powders may for instance be produced by crushing ferro-electric ceramics and milling the material or pulverising it and sieving or otherwise grading it in similar ways as is done for metal powders. The powders are now put into a film in ways analogous to the process used for making films with metal powders. One such method consists in mixing these powders with an ink or paint medium which consolidates into an elastic material of the desired qualities, and printing or otherwise coating one side of a metal foil with it. In order to get the ferro-electric powders to settle on the foil and not to float on top of the ink there should be, contrary to requirements for metal powder inks, no big surface tension between the ink and ceramic powders, further, the specific gravity of the ink should be lower than that of the powder, and the viscosity of the ink may be very low. Rolling, wiping, brushing, etc., may be used to dimension the film correctly and to orientate the powders in the desired monolayer in close contact with the foil etc. Heating may be employed to get the paint or ink to the right viscosity, and constant stirring or other means employed to keep the powders in suspension in the paint or ink duct. In order to combat the tackiness of the ink film when it is not required, for instance when immediate recoiling of the foil is desired, and also to assist in gap filling, a fine powder of ferro-electric ceramic may be dusted on the film. The coated foil may be processed further as described above to produce a material for making up capacitors of the wound, piled or cut out variety, etc., but it should be borne in mind that the floating of the foil with the ferro-electric powders of film thickness size is applied to one side of the foil only, so that on superposition of two such foils these powders stretch from one foil to the other substantially without an intermediate layer or break along the film.

The other principal method used in metal powder coating may also be employed, namely, the dusting on of the ferro-electric ceramic powders of film thickness size to a foil coated or printed with a tacky oil or resin film and the settling of the powders to the foil surface assisted by the specification of the oil or resin film, heat and pressure as above.

A further method consists essentially in preparing an intaglio printing plate or cylinder, similar to that used to print an ink film of film thickness, filling the cavities either with ferroelectric ceramic powders of film thickness or with fine powders of ferro-electric ceramic material and compacting the powders in these cavities by rolling, wiping the surface of the plate or cylinder with a doctor blade and transferring the content of the cavities to an oil or resin coated foil by, so to speak, printing it onto the foil.

Alternatively, it is possible first to give to the plate or cylinder a surface to which the powders and the oil or resin will not adhere, by chrome plating for instance, then to fill the cavities and compact the powders therein, then to fill the pores of the compacted powder areas with oil or resin, and then to imprint a metal foil. The surplus oil or resin is squeezed into the gaps left on the foil, which may be precoated with a thin oil or resin film if that surplus is not sufficient to fill the volume of the gaps. The gaps are predetermined, to some extent, by the screen of the intaglio plate or cylinder and this screen also effects the shaping of the compacts into long narrow flakes.

There are also other means available to achieve the carrying out of the invention. A dielectric film of the described structure may be formed as a self-supporting fabric, or at least as a fabric which can be rolled, or otherwise shifted off a temporary support on to the metal foil, in a number of ways of which the following are examples:

A paper, textile, glass fibre, synthetic rubber or plastic film of the thickness of the dielectric film desired, may be made like a net with very tiny holes or slots, for instance by weaving, roller or other perforating, etc. The holes or slots, the latter running in the direction across the flexing direction of the film, are filled up with ferro-electric ceramic material by making a fine dispersion of this material in water or a volatile liquid and coating this not repeatedly until all the holes or slots are filled up. The excess is doctored off, and the fabric is rolled or pressed to compact the flakes which are in the holes or slots stretching across the whole thickness of the fabric. By first suitably impregnating the paper or textile, or by suitable choice of the plastic, a bond to the ceramic and an elastic film can thus be achieved. This film can be used between metal foils like the paper layers hitherto employed, but a single layer only should be used to ensure that the ferro-electric flakes stretch across the whole dielectric without interruption.

Another way to create such a dielectric film is to compact fine ferro-electric ceramic powders into a brittle film (dry or wet), or obtain such a brittle film by stripping a fused ceramic film from its support, or arranging flaked ceramic powders of film thickness in a single layer. Then a resin is cast onto such film and forced between the gaps of the ceramic layer. The excess is squeezed off by a porous platen or removed by blotting paper. This is followed by a mechanical and/or solvent cleaning of the surface of the film after the resin has consolidated, jellied or become firm by cooling. In order to make the film sufficiently elastic for rolling into a rolled block capacitor, heating it during the rolling operation may be helpful.

It should be emphasised that the gaps between the ceramic particles which are filled by the elastic insulating material form an essential part of the film. They not only link the ceramic particles together, bond to the foil and act as a dielectric insulator, but their spacing, the flexibility of the elastic insulating material, and the degree of wetting and of adherence to the ceramic determine the usefulness of the film which is essentially a single layer link of ferro-electric and elastic particles. The elastic insulating material linking the ferro-electric ceramic powders assumes an even greater importance contributing substantially to the dielectric constant for the whole film if the invention cannot be carried out, as in the above examples, by using a monolayer of ferro-electric particles of film thickness size, but has to be carried out by the use of ferro-electric powders of much smaller size without using the possibility, also described above, of compacting these finer powders into film thickness size particles.

Although it is not possible under such circumstances to achieve as high a dielectric constant of the whole film as in previously described examples, a great improvement over dielectric films hitherto proposed is possible by a combination of an elastic insulating material of as high a dielectric constant as can be found and as heavy a loading of the film with the fine ferro-electric powders as can be achieved without destroying the degree of flexibility required. There are further considerations: By using thin flaky powders orientated parallel to the metal foil and by using an elastic insulating material which has, or is given, such low viscosity during the formation of the film, for instance by heating or a high volatile solvent content, or its pre-polymerisation state as in casting resin, that the flaky ferro-electric powders settle one on top of the other with very thin, if any, layers of the elastic binder between the powders, a further great improvement of the dielectric constant of the film is possible.

The elastic insulating binder need for many applications not have too small a loss factor; in the above case the high dielectric constant is more important and consequently polar materials are the first choice. Examples of suitable materials are silicone resins, neoprene, linseed oil, phenol formaldehyde resins, cellulose acetate and methyl cellulose, chlorinated waxes such as the Seekay wax or Halowax—particularly if they are compounded with rubber such as neoprene or with silicone to reduce their brittleness. All these substances are available in solutions and some can be formulated into printing inks or paints for a variety of application devices, some can be brought into a very low viscosity range by heat and there is a choice of a wide range of elasticity between the waxes and phenol formaldehyde resins on the one side and the synthetic rubbers and silicones on the other.

Regarding the ferro-electric ceramic particles: If no particles of dielectric thickness are available, nor any facility to compact fine powders into suitable thick flakes, any size powder of flaky shape is the next choice. If these are not available either, fine powders of any shape may be mixed to a paste with a solution of one of the polar substances described above, using a minimum of solid and a maximum of volatile solvent, and rolled under heavy pressure into a very thin brittle film and broken up so that flaky resin, or wax bound particles, are formed which may be less than dielectric thickness. Alternatively and preferably, a thin coating with minimum binder and an overload of ferro-electric ceramic powder is printed, or coated, on a flexible foil or other temporary carrier, dusted with powder as long as it is tacky, and left to dry or consolidate into a hard brittle film which falls into thin flakes when stripped off by bending or rolling the flexible carrier. A linseed oil medium with phenol formaldehyde resin addition, or any solution of the polar substances given above, is possible, but a substance which consolidates into an insoluble or less soluble state is preferred for this flake making. An advantage of these flakes is that they form a good bond when they are incorporated in the final coating on the metal foil because the flake binder links strongly with the elastic insulating matrix material, particularly if both are the same substance, even though in different states of polymerisation or viscosity at the time of formation of the coating. If even this facility of flake making is not available the only means to orientate the fine ferro-electric ceramic powders so that they stretch across the dielectric irregularly, but with as small interstices as possible, is to use a maximum of powders and a very low viscosity matrix substance of relatively high dielectric constant and press the powders together and on the metal foil by rolling or other means when forming the coating.

The preferred method of capacitor manufacture under such circumstances is to print or coat a metal foil repeatedly with an ink or paint made up from the polar substances described of very low viscosity, preferably owing to a high volatile solvent content, heavily pigmented with the thin flaky powders, dust each layer with the powders as long as the ink is tacky, and heavily roll to compress the layers and squeeze out the binder as long as it is fluid.

As a further modification of any of the examples described above, before putting the insulating material on the foil, the foil may be pre-coated with a conductive cement in a very thin layer, to enhance the adherence between the foil and the insulating coating. Although the conductive cement may have a fairly high specific resistance, the layer will be so thin that its ohmic resistance is negligible. Again, a layer of conductive cement may be applied to the outer surface of the insulating coating, to facilitate the attachment of a second sheet of metal foil in the formation of a multi-layer product.

What I claim as my invention and desire to secure by Letters Patent is:

1. A method of making multi-layer capacitor and printed circuit material which comprises applying a layer of an etch-resistant dielectric material to one surface of a conductive metal foil, protecting the opposite surface of the foil with an etch-resistant material, subjecting the entire thus prepared foil to a prolonged etching treatment to etch away the metal from areas of the foil exposed by interruptions in the etch-resistant coatings and from areas in the immediate proximity thereof, and thereafter superimposing a layer of conductive material over the dielectric layer.

2. A method of making multi-layer capacitor and printed circuit material as claimed in claim 1, which comprises interposing a layer of conductive material between the metal foil and the layer of dielectric material.

3. A method of making multi-layer capacitor and printed circuit material as claimed in claim 2, in which the layer of conductive material applied to the metal foil has a higher specific resistance than the foil.

4. A method of making multi-layer capacitor and printed circuit material, which comprises applying to both sides of a sheet of metal foil a thin coating of a liquified adherent etch-resistant dielectric material, solidifying the coating, and guiding the coated foil through an etching bath for a prolonged period until exposed areas of metal and portions of initially unexposed metal adjacent to said exposed areas are eaten away, and thereafter superimposing a further layer of conductive material.

5. A method of making multi-layer capacitor and printed circuit material as claimed in claim 4, which includes the additional step of applying a second coating of insulating material after the completion of the etching process and before the superimposition of the further layer of conductive material.

6. A method of making multi-layer capacitor and printed circuit material as claimed in claim 4 in which the etch-resistant dielectric material consists of a liquid insulating binding material in which are embedded particles of a material of high permittivity.

7. A method of making multi-layer electric capacitor and printed circuit material, which comprises applying a thin coating of a liquified adherent etch-resistant dielectric material to both sides of sheets of metal foil, solidifying the coatings, etching both sides of the coated sheets and then superimposing at least two of the coated sheets.

8. A method of making multi-layer electric capacitor and printed circuit material, which comprises applying to both sides of a sheet of metal foil a thin coating of a liquified adherent etch-resistant dielectric material which is flexible when dried, solidifying the coating, etching both sides of the coated sheet, and folding it over so as to form two parallel foil layers separated by dielectric material.

9. A method of making multi-layer electric capacitor and printed circuit material, which comprises applying to both sides of sheets of metal foil thin coatings of a liquified adherent etch-resistant dielectric material, solidifying the coatings, treating the coated surfaces of the sheets in an etching bath until exposed areas of metal and portions of initially unexposed metal adjacent to said exposed areas are eaten away, and superimposing at least two of the coated sheets.

10. A method of making multi-layer electric capacitor and printed circuit material, as claimed in claim 9 in which only a part of the metal foil is given a dielectric coating, which includes covering the part of the metal foil not given a dielectric coating, before etching, with a material which is not affected by the etching bath, and after etching removing this covering without disturbing the dielectric coating so as to expose bare metal foil.

11. A method of making multi-layer electric capacitor and printed circuit material, as claimed in claim 9, which includes the additional step of applying a second coating of dielectric material after completion of the etching process.

12. A method of making multi-layer electric capacitor and printed circuit material, which comprises applying a thin coating of an etch-resistant dielectric coating material to both sides of a sheet of metal foil, treating substantially the entire outer surface of the coated foil in an etching bath until exposed areas of metal and portions of initially unexposed metal adjacent to said exposed areas are eaten away, and after completion of the etching treatment applying a conducting layer to at least one surface of the dielectric coating.

13. A method of making multi-layer electric capacitor and printed circuit material, as claimed in claim 12, in which the dielectric material is stable in a vacuum and the conducting layer is applied by vacuum deposition.

14. A method of making multi-layer electric capacitor and printed circuit material, as claimed in claim 12, which includes applying a further coating of etch-resistant dielectric material over the conducting layer and thereafter subjecting the entire product to a second etching treatment to eat away exposed areas of said conducting layer and portions of initially unexposed conducting layer adjacent to said exposed areas.

15. A method of making multi-layer electric capacitor and printed circuit material, which comprises coating each of two sheets of metal foil on both sides with a thin adherent coating of etch-resistant material, forming on one side of each sheet at least one line of exposed areas these areas being separated from one another by distances shorter than the lengths of the areas, treating substantially the entire surface area of both sides of the coated sheets in etching baths to eat away the exposed areas of metal foil, and then superimposing the sheets so that the portions of metal left in the gaps between the said exposed areas of one sheet are in alignment with but do not overlap the corresponding portions of metal in the other sheet.

16. A method of making multi-layer electric capacitor and printed circuit material, as claimed in claim 15, in which the said exposed areas are of strip-like form and, when the two sheets are superimposed, are aligned across the width thereof to form a line of severance.

17. A method of making multi-layer electric capacitor and printed circuit material, as claimed in claim 15, in which there are two sets of lines of exposed areas running at right angles to each other, providing a grid of lines of severance.

18. A method of making multi-layer electric capacitor and printed circuit material, which comprises printing on both sides of each of two sheets of metal foil a thin coating of an adherent etch-resistant dielectric material, the printing being such as to leave at least one line of exposed areas of foil on one side of each of the sheets, these areas being separated from one another by distances shorter than the lengths of the areas, treating the sheets in etching baths to eat away the exposed areas of metal foil, and then superimposing the sheets so that the portions of metal left in the gaps between the said exposed areas of one sheet are in alignment with but do not overlap the corresponding portions of metal in the other sheet.

19. A method of making electric capacitor and printed circuit material which comprises applying a thin etch-resistant dielectric coating to a sheet of metal foil, subjecting the entire coated sheet to prolonged etching, applying a second coat of dielectric material after etching, and securing a second sheet of metal foil to the outer surface of the coating with the aid of a conductive cement.

20. Multi-layer capacitor and printed circuit material, comprising a sheet of metal foil, a thin coating of an adherent dielectric material on both sides of said sheet, undercut portions under and adjacent to any gaps in the coatings from which metal has been etched away and another conductive layer superimposed over one of the coatings.

21. Multi-layer capacitor and printed circuit material, which comprises two metal foils each coated on both sides with thin coatings of adherent dielectric material and bonded together, and provided with lines of severance along which portions of the metal of each foil have been etched away, these portions being arranged in staggered relationship so that the remaining portions of metal along these lines are aligned but do not overlap.

22. Multi-layer capacitor and printed circuit material as claimed in claim 21 including at least two sets of lines of severance arranged at right angles to one another.

23. Multi-layer capacitor and printed circuit material as claimed in claim 21, in which each metal foil has a marginal portion which extends beyond the edge of the adjacent metal foil, and means on said marginal portions for indicating the extremities of the lines of severance.

24. A method of making multi-layer capacitor and printed circuit material as claimed in claim 4, in which the etch-resistant dielectric material is flexible when solidified.

25. A method of making multi-layer capacitor and printed circuit material as claimed in claim 4, in which the etch-resistant dielectric material is a composite material consisting of at least two components at least one of which has a high permittivity.

26. A method of making multi-layer capacitor and printed circuit material which comprises bonding etch-resistant dielectric coatings to both sides of the sheet of metal foil, submerging the entire coated foil in an etching bath until exposed areas of metal and portions of initially unexposed metal adjacent to the said exposed areas are etched away, retaining the dielectric coatings on the metal after the etching treatment and superimposing a layer of conductive material over the coating on at least one side of the foil.

27. Multi-layer capacitor and printed circuit material as claimed in claim 20, in which there is a conductive layer of relatively high specific resistance interposed between the foil and the dielectric coating.

PAUL EISLER.

REFERENCES CITED

The following references are of record in the file of this patent:

UNITED STATES PATENTS

| Number | Name | Date |
| --- | --- | --- |
| 1,909,079 | Steerup | May 16, 1933 |
| 1,923,539 | Jenny | Aug. 22, 1933 |
| 1,947,112 | Ruben | Feb. 13, 1934 |
| 2,226,589 | Smyers | Dec. 31, 1940 |
| 2,281,602 | Ruben | May 5, 1942 |
| 2,325,531 | Mertens | July 27, 1943 |
| 2,389,018 | Ballard | Nov. 13, 1945 |
| 2,398,176 | Deyrup | Apr. 9, 1946 |
| 2,441,960 | Eisler | May 25, 1948 |
| 2,465,284 | Schmidt | Mar. 22, 1949 |